US011156038B1

(12) United States Patent
Granger et al.

(10) Patent No.: US 11,156,038 B1
(45) Date of Patent: Oct. 26, 2021

(54) SPLIT BOWL WEAR BUSHING

(71) Applicant: FORUM US, INC., Houston, TX (US)

(72) Inventors: Jeremy S. Granger, Rayne, LA (US); Lawrence E. Childress, II, Spring, TX (US)

(73) Assignee: FORUM US, INC., Houston, TX (US)

( * ) Notice: Subject to any disclaimer, the term of this patent is extended or adjusted under 35 U.S.C. 154(b) by 0 days.

(21) Appl. No.: 16/991,889

(22) Filed: Aug. 12, 2020

(51) Int. Cl.
*E21B 19/10* (2006.01)
*E21B 17/10* (2006.01)
*F16B 21/18* (2006.01)

(52) U.S. Cl.
CPC ........ *E21B 17/1007* (2013.01); *F16B 21/186* (2013.01)

(58) Field of Classification Search
CPC ................................ E21B 19/10; E21B 19/07
See application file for complete search history.

(56) References Cited

U.S. PATENT DOCUMENTS

| | | | | |
|---|---|---|---|---|
| 1,568,198 A * | 1/1926 | Tschappat | ................ | E21B 19/10 188/67 |
| 2,874,436 A * | 2/1959 | Allen | ...................... | E21B 19/10 175/423 |
| 3,156,026 A * | 11/1964 | Kelley | .................... | E21B 19/10 175/423 |
| 3,422,506 A * | 1/1969 | Turner | .................... | E21B 19/10 188/67 |
| 3,457,605 A * | 7/1969 | Kingsbury | ................ | E21B 3/04 188/67 |
| 4,306,339 A * | 12/1981 | Ward | ...................... | E21B 19/10 188/67 |
| 4,511,168 A * | 4/1985 | Haynes | ................... | E21B 19/10 188/67 |
| 7,032,690 B2 | 4/2006 | Ramey et al. | | |
| 7,134,531 B2 | 11/2006 | Ramey et al. | | |
| 7,216,717 B2 | 5/2007 | Severin et al. | | |
| 7,296,630 B2 | 11/2007 | Severin et al. | | |
| 7,398,833 B2 | 7/2008 | Ramey et al. | | |
| 7,510,033 B2 | 3/2009 | Lutzhoft et al. | | |
| 8,079,627 B2 | 12/2011 | Lutzhoft et al. | | |
| 8,596,344 B2 | 12/2013 | Lutzhoft et al. | | |
| 8,991,485 B2 | 3/2015 | Chenault et al. | | |
| 9,057,225 B2 | 6/2015 | Vierke et al. | | |
| 9,062,698 B2 | 6/2015 | Baier et al. | | |
| 9,181,762 B2 | 11/2015 | Stoldt et al. | | |
| 9,816,347 B2 | 11/2017 | Chenault et al. | | |
| 2009/0057032 A1 * | 3/2009 | Angelle | .................. | E21B 19/07 175/423 |
| 2010/0326666 A1 * | 12/2010 | Maa | ........................ | E21B 19/10 166/344 |
| 2019/0136647 A1 | 5/2019 | Vierke | | |

* cited by examiner

*Primary Examiner* — Kipp C Wallace
(74) *Attorney, Agent, or Firm* — Patterson + Sheridan, L.L.P.

(57) ABSTRACT

A device for extending the useable life of a split bowl by reducing wear of the thru bore of the split bowl during drilling operations. A replaceable wear bushing with a wear indicator is inserted in the thru bore of the two halves of the split bowl. The wear indicator may be a groove formed in an inner diameter of the wear bushing. The wear bushing may be inserted in a bushing groove formed in an inner diameter of the thru bore of the two halves of the split bowl. A retainer plate may be used to retain the wear bushing in the bushing groove.

21 Claims, 9 Drawing Sheets

SPLIT BOWL WEAR BUSHING

BACKGROUND

Field

Embodiments of the disclosure generally relate to apparatus and methods for reducing thru bore wear of split bowls during drilling operations.

Description of the Related Art

In drilling operations, whether on water-based or land-based drilling rigs, a drill string is lowered through a central bore of split bowl that is supported in the rig floor. The central bore of the split bowl has a tapered inner surface leading into a thru bore. One or more slips are lowered along the tapered inner surface into contact with the drill string to grip the drill string. The slips are used to support the drill string to enable the addition or removal of a section of the drill string. The slips are then raised up along the tapered inner surface out of contact with the drill string to release the drill string. When the slips are not gripping the drill string, the drill string may be rotated as it is being lowered through the central bore of the split bowl.

Over time as the same or different drill strings are being rotated and/or lowered through the split bowl, substantial wear occurs in the central bore of the split bowl, specifically in the thru bore and along the tapered inner surface leading into the thru bore, due to frictional contact with the outer surface of the drill string. A substantially worn region in the central bore results in a loss of contact between the slips and the tapered inner surface of the split bowl near the thru bore, which is used to support the slips when gripping the drill string. Loss of contact with the slips results in loss of support of the drill string during the addition or removal of a section of the drill string, which can lead to an inadvertent release or slippage of the drill string.

Therefore, there is a need for new and improved apparatus and methods for reducing central bore wear of split bowl assemblies during drilling operations.

SUMMARY

Embodiments of the present disclosure generally relates to a split bowl assembly. The split bowl assembly comprises a split bowl comprising a first half and a second half forming a tapered annular inner surface, a thru bore disposed below the tapered annular inner surface, a bushing groove formed in an inner diameter of the thru bore, and a slot formed in an outer diameter of the split bowl, and a wear bushing assembly comprising a wear bushing disposed in the bushing groove and comprising a slot formed in an outer diameter of the wear bushing, and a retainer plate at least partially disposed in the slot formed in the outer diameter of the split bowl and at least partially disposed in the slot formed in the outer diameter of the wear bushing.

In one embodiment, a method of installing a wear bushing in a split bowl assembly is disclosed. The method comprises positioning a first half and a second half of a split bowl of split bowl assembly together. A bushing groove is formed in an inner diameter of a thru bore of the first half and the second half and a slot is formed in an outer diameter of the split bowl, inserting a wear bushing in the bushing groove, wherein a slot is formed in an outer diameter of the wear bushing, and inserting a retainer plate into the slot formed in the outer diameter of the split bowl, and at least partially inserting the retainer plate in the slot formed in the outer diameter of the wear bushing to inhibit rotation of the wear bushing relative to the split bowl.

BRIEF DESCRIPTION OF THE DRAWINGS

So that the manner in which the above recited features of the disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1A:
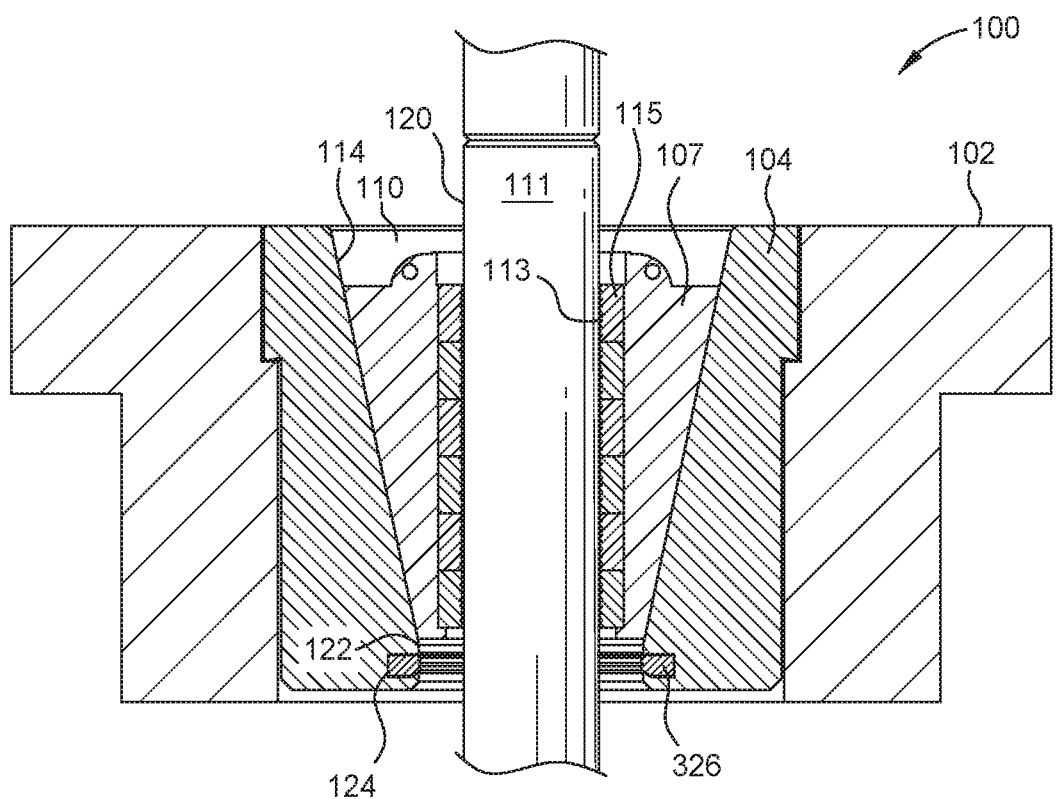
FIG. 1A is a cross-sectional view of a split bowl assembly.

FIG. 1A shows a split bowl assembly 100 that comprises a split bowl 104 disposed in a drill floor 102. A drill string 111, which may comprise multiple sections of drill pipe threadedly connected together, is disposed through a central bore 110 of the split bowl 104. The central bore 110 is formed by a tapered annular inner surface 114 that leads into a thru bore 122. A bushing groove 124 is formed in the thru bore 122 of the split bowl. A wear bushing 326 is disposed in the bushing groove 124. One or more slips 107 are movable down along the tapered annular inner surface 114 and into engagement with the drill string 111 to grip the outer surface 120 of the drill string 111. The slips 107 have a plurality of slip inserts 115 each having teeth 113. In one embodiment, the teeth 113 of the slip inserts are made of a hardened steel. In one embodiment, the teeth 113 may be integrally formed with the slips 107 without the use of separate slip inserts.

Figure 1B:
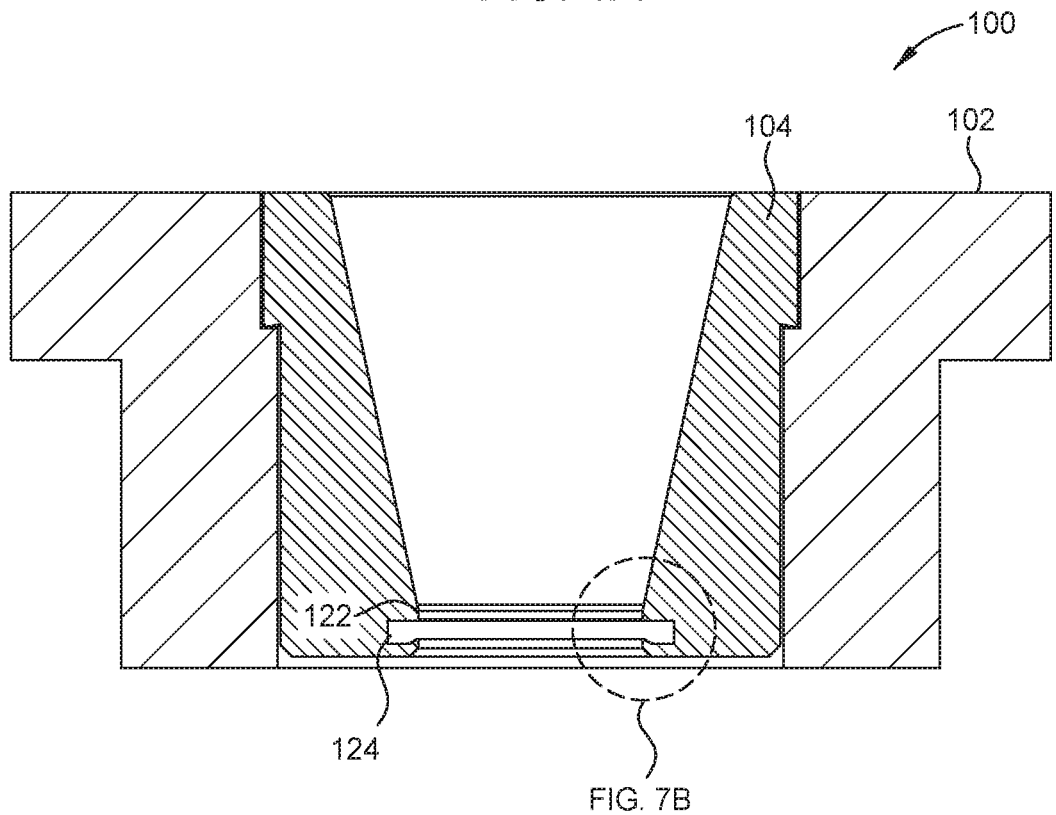
FIG. 1B is another cross-sectional view of a split bowl assembly.

FIG. 1B shows only the split bowl 104 disposed in the drill floor 102. The drill string 111, the slips 107, and the wear bushing 326 from FIG. 1A have been removed for clarity. As shown, the bushing groove 124 is formed in the thru bore 122 of the split bowl.

Figure 2:
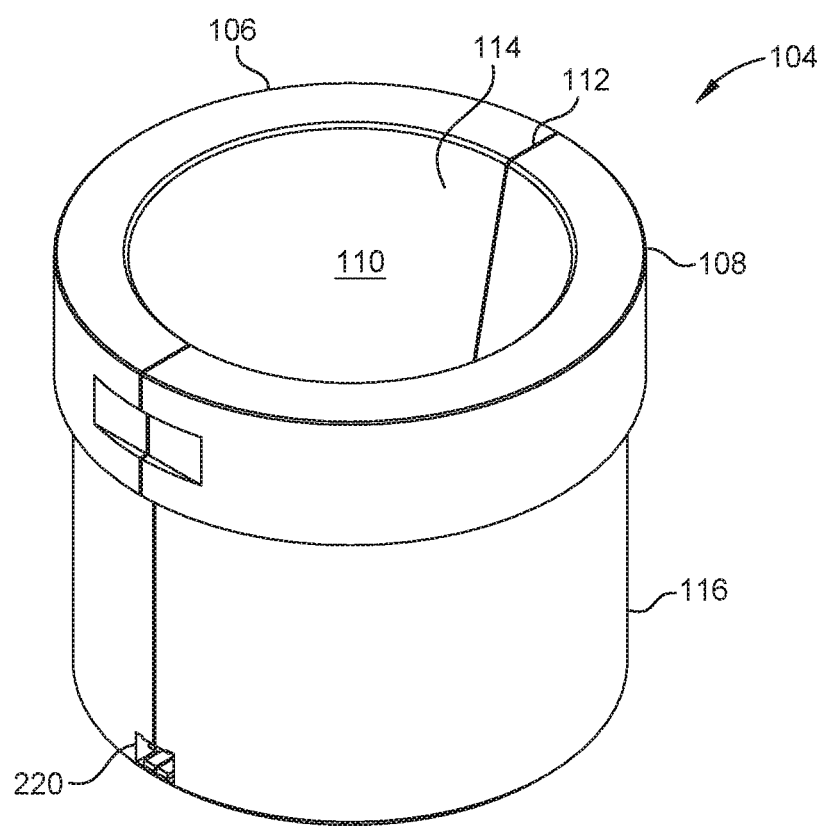
FIG. 2 is an isometric view of a split bowl assembly.

FIG. 2 depicts the split bowl 104 of the split bowl assembly 100. The split bowl 104 has a first half 106 and a second half 108. The first half 106 and second half 108 each have an interface 112. When assembled, the first half 106 and second half 108 may contact each other at the interfaces 112. The first half 106 and second half 108 form the central bore 110 with the tapered annular inner surface 114 and the thru bore 122. The split bowl 104 has an outer diameter 116. At least one slot 220 is formed in the outer diameter 116 of the split bowl 104. In one embodiment, the slot 220 is a T-shaped slot. In one embodiment, the slot 220 is formed in the interface 112 of the first half 106 of the split bowl 104, and a slot 221 is formed in the interface 112 of the second half 108 of the split bowl 104. The slot 220 may be identical to the slot 221.

Figure 3:
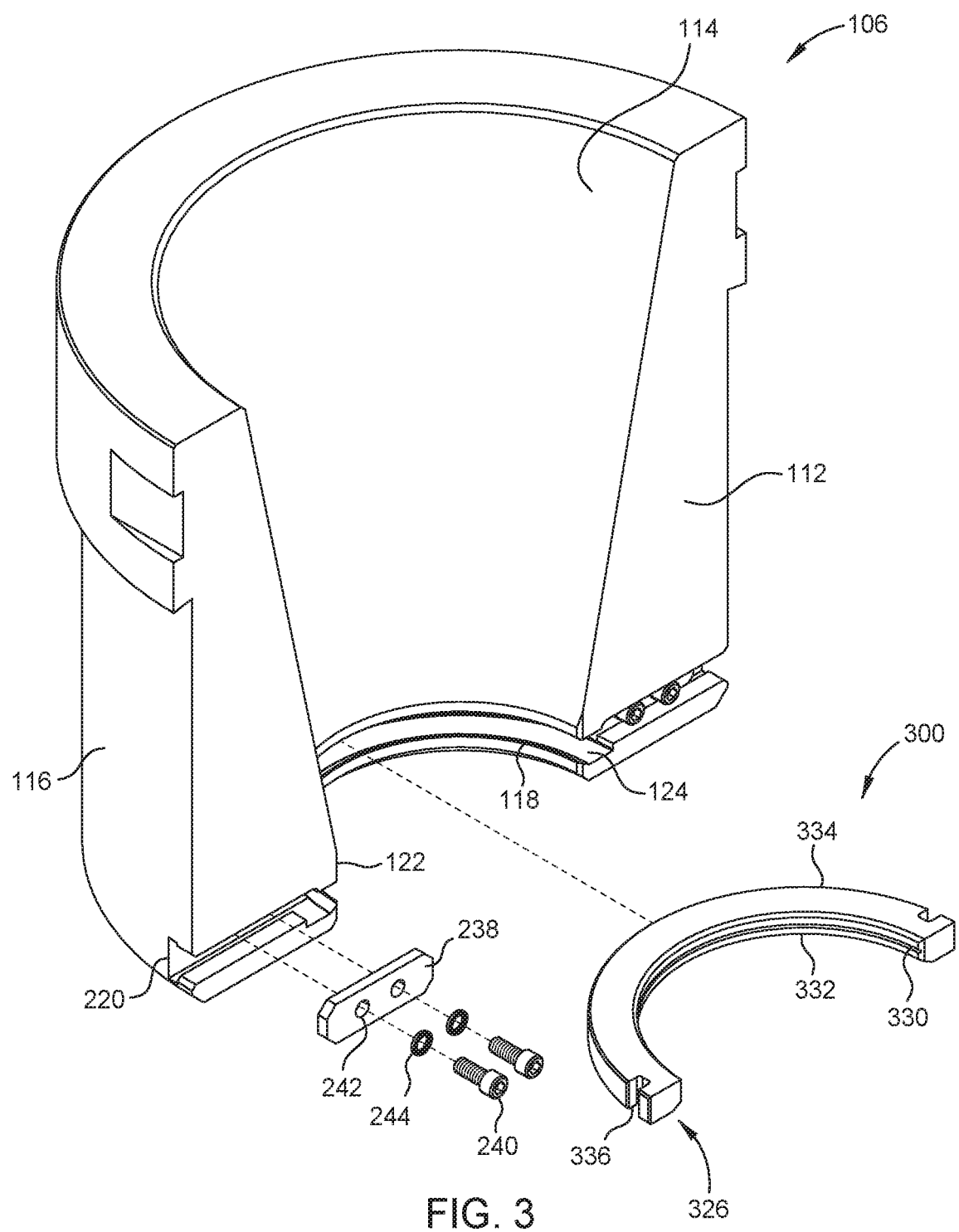
FIG. 3 is an exploded view of a first half of the split bowl and a wear bushing assembly.

FIG. 3 depicts an exploded view of the first half 106 of the split bowl 104 and a first half of a wear bushing assembly 300. The first half 106 comprises the interface 112, the tapered annular inner surface 114, the thru bore 122, and the outer diameter 116. The thru bore 122 is disposed below the tapered annular inner surface 114 and has an inner diameter 118. A bushing groove 124 is formed in the inner diameter 118 of the thru bore 122. The second half 108 of the split bowl 104 may be identical to the first half 106. The second half of the wear bushing assembly 300 may be identical to the first half depicted in FIG. 3.

The wear bushing assembly 300 includes a wear bushing 326 that is disposed in the bushing groove 124. The wear bushing 326 is made of an abrasion resistant material, such as steel. The wear bushing 326 has a wear groove 330 formed in an inner diameter 332 of the wear bushing 326. The wear groove 330 is used to determine wear within the split bowl 104. In particular, the inner diameter 118 of the thru bore 122 is greater than the inner diameter 332 of the wear bushing 326 when first used such that any drill string disposed through the split bowl 104 will contact and wear down the wear bushing 326 prior to contacting the thru bore 122. In one embodiment, the inner diameter 118 of the thru bore 122 is about 10.18 inches and the inner diameter 332 of the wear bushing 326 is about 10.06 inches. In one embodiment, a depth ratio between the inner diameter 332 of the wear bushing 326 and the wear groove 330 is between about 0.03 and about 0.30. The wear bushing 326 may be replaced upon any sign of wear to the wear groove 330.

At least one slot 336 is formed in an outer diameter 334 of the wear bushing 326. As shown in FIG. 3, a slot 336 is formed in the outer diameter 334 of each end of the wear bushing 326 and the slots 336 are vertically oriented. The one or more slots 336 however may be formed at any location along the outer diameter 334 of the wear bushing 326, may be oriented in any direction, and/or may comprise any shape.

The wear bushing 326 is radially fixed within the bushing groove 124 of the first half 106 of the split bowl 104 by at least one retainer plate 238. A portion of the retainer plate 238 is inserted into the slot 336 of the wear bushing 326, which inhibits rotation of the wear bushing 326 relative to the split bowl 104. The retainer plate 238 is fixed to the first half 106 of the split bowl 104 by one or more fasteners 240. The retainer plate 238 is at least partially disposed in the slot 220 formed in the outer diameter 116 of the first half 106 of the split bowl 104. The fastener 240 is inserted through one or more holes 242 formed in the retainer plate 238 and threaded into the first half 106 of the split bowl 104 to secure the retainer plate within the slot 220. A washer 244, such as a lock washer, may be used between the retainer plate 238 and the fastener 240.

The wear bushing 326 is placed within the bushing groove 124 such that the slot 336 of the wear bushing 326 is aligned with the slot 220 of the first half 106 of the split bowl 104. In particular, to install the wear bushing 326 in the first half 106 of the split bowl 104, one end of the wear bushing 326 may be inserted into one end of the bushing groove 124 and then rotated into place into the bushing groove 124 until the slot 336 at least partially aligns with the slot 220 of the first half 106 of the split bowl 104. The retainer plate 238 may be inserted laterally into the slot 220 from the outer diameter 116 of the first half 106 of the split bowl 104. The retainer plate 238 may be inserted into the slot 220 until a portion of the retainer plate 238 extends into the slot 336 of the wear bushing 326. The fastener 240 may then be inserted into the hole 242 formed in the retainer plate 238 to secure the retainer plate 238 to the first half 106 of the split bowl 104. The other half of the wear bushing assembly 300 may be installed in the second half 108 of the split bowl 104 in a similar manner. The interfaces 112 of the first half 106 and the second half 108 may be placed in contact with each other and the entire split bowl 104 may be positioned in the drill floor 102 so that the slips 107 can be inserted into the central bore 110 for supporting the drill string 111 as shown in FIG. 1.

Figure 4:
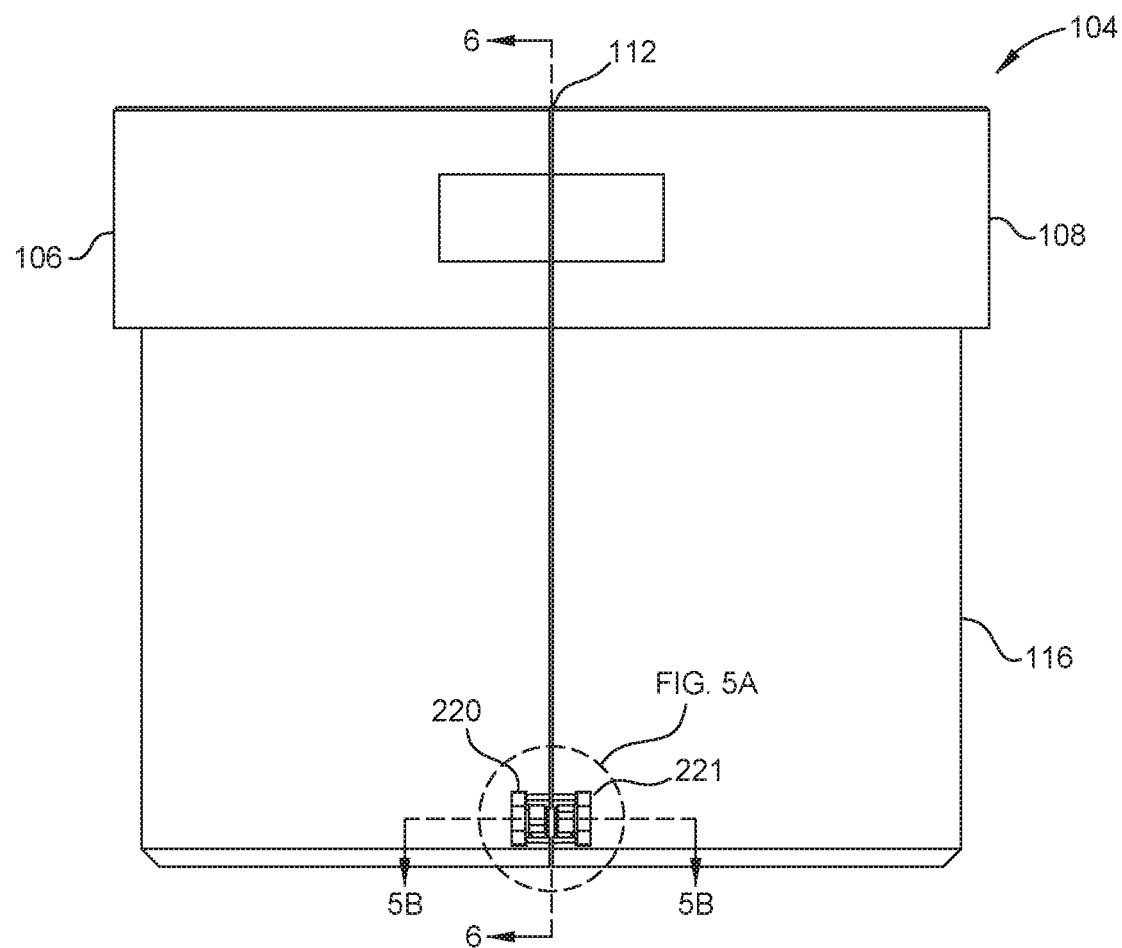
FIG. 4 is a side view of the split bowl.

FIG. 4 is a side view of the split bowl 104 with the first half 106 and the second half 108 in contact with each other at the interfaces 112. As shown in FIG. 4, the slots 220 and 221 are formed in the lower outer diameter 116 of the first half 106 and second half 108 of the split bowl 104. The slots 220 and 221 may be T-shaped slots through which the retainer plates 238 are inserted to help secure the wear bushing 326 from rotation within the slip bowl 104.

Figure 5A:
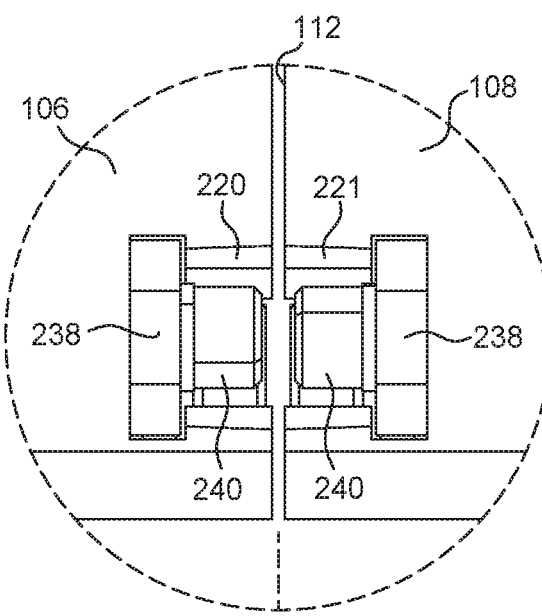
FIG. 5A is a detailed view of slots formed in the outer diameter of the split bowl.

FIG. 5A is a detailed view of the slots 220 and 221 formed in the outer diameter 116 of the first half 106 and the second half 108 of the split bowl 104. One retainer plate 238 is at least partially disposed within the slot 220, and one retainer plate 238 is at least partially disposed in the slot 221. The retainer plates 238 are coupled to the respective slots 220 and 221 by the fasteners 240.

Figure 5B:
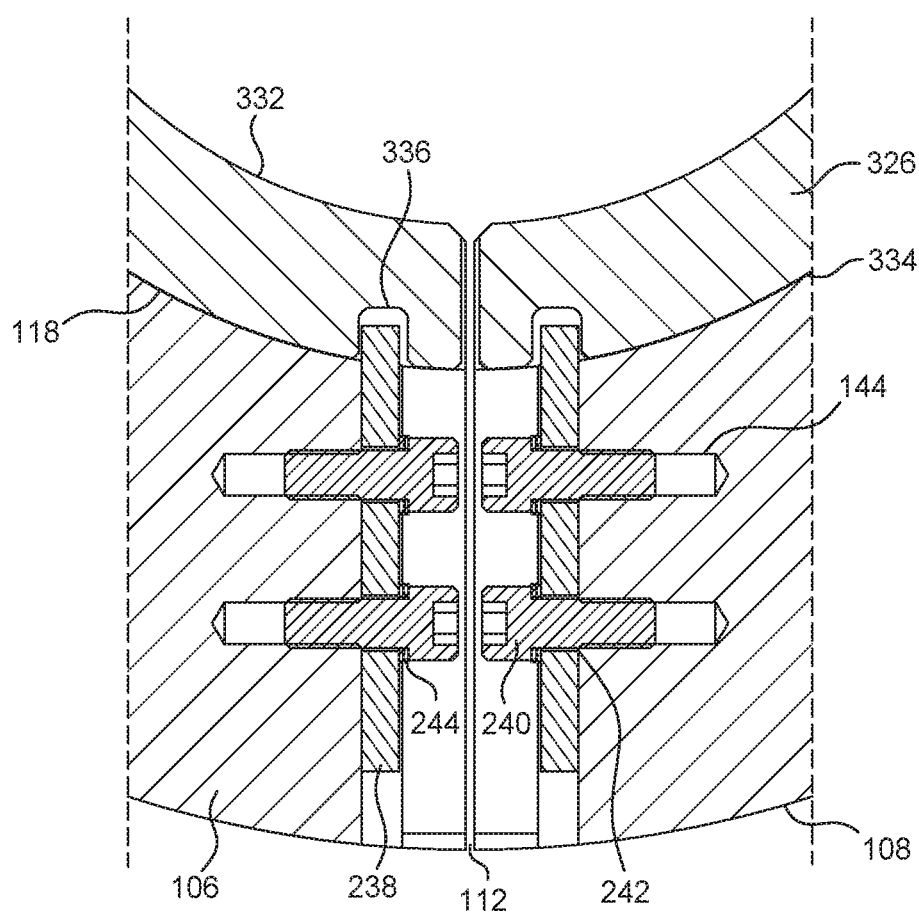
FIG. 5B is a partial cross sectional view of a portion of the split bowl and the wear bushing assembly.

FIG. 5B is a partial cross sectional view of a portion of the split bowl 104. The first half 106 and the second half 108 of are placed adjacent to each other at the interfaces 112. The wear bushing 326 is positioned in the bushing groove 124 formed in the first half 106 and the second half 108. The outer diameter 334 of the wear bushing 326 may be in contact with the inner diameter 118 of the split bowl 104. The wear bushing 326 has at least one slot 336 formed in the outer diameter 334. One retainer plate 238 is at least partially disposed in the slot 220 of the first half 106 of the split bowl 104 and is at least partially disposed in the wear bushing slot 336 of the half of the wear bushing 326. One retainer plate 238 is at least partially disposed in the slot 221 of the second half 108 of the split bowl 104 and is at least partially disposed in the wear bushing slot 336 of the other half of the wear bushing 326. The wear bushing 326 is radially fixed within the bushing groove 124 by the retainer plates 238. The retainer plates 238 are coupled to the respective slots 220 and 221 by at least one fastener 240. The fasteners 240 are disposed through holes 242 formed in the respective retainer plates 238 and threaded into fastener holes 144 formed in the respective interfaces 220 and 221 of the first half 106 and the second half 108 of the split bowl 104.

Figure 6:
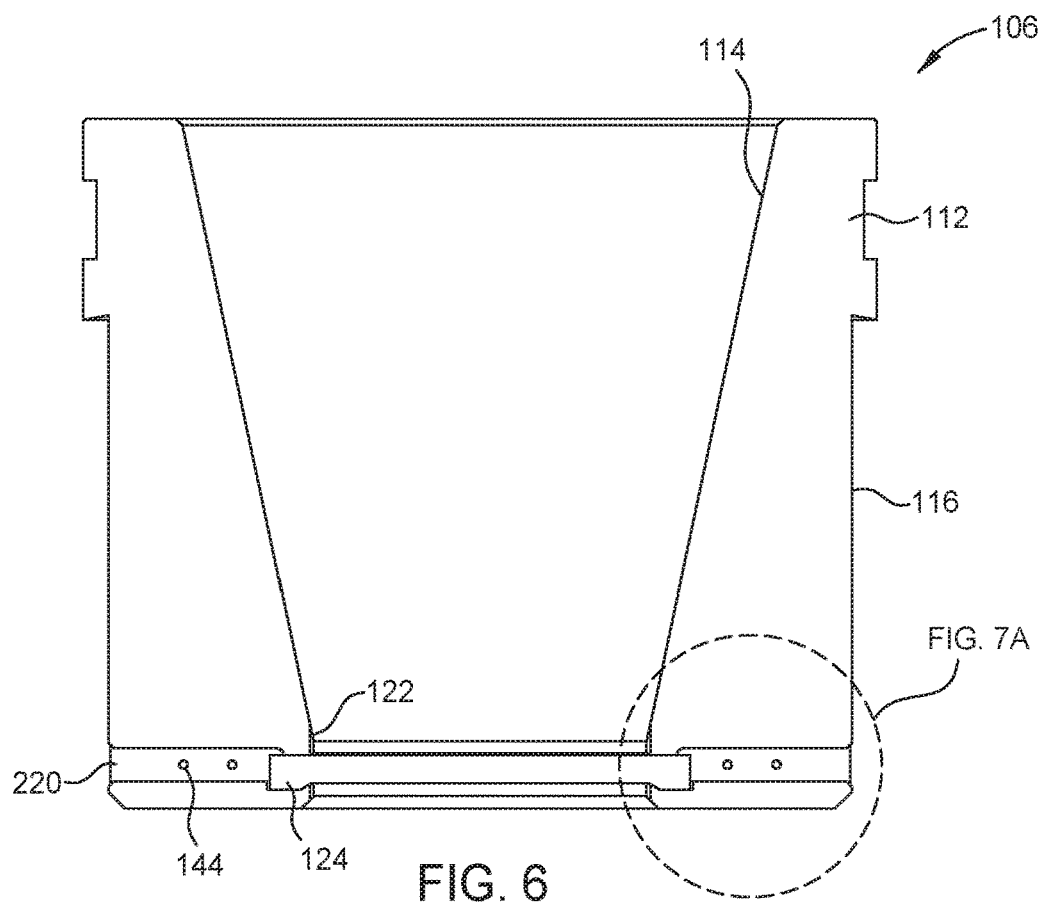
FIG. 6 is a front view of the first half of the split bowl.
Figure 7A:
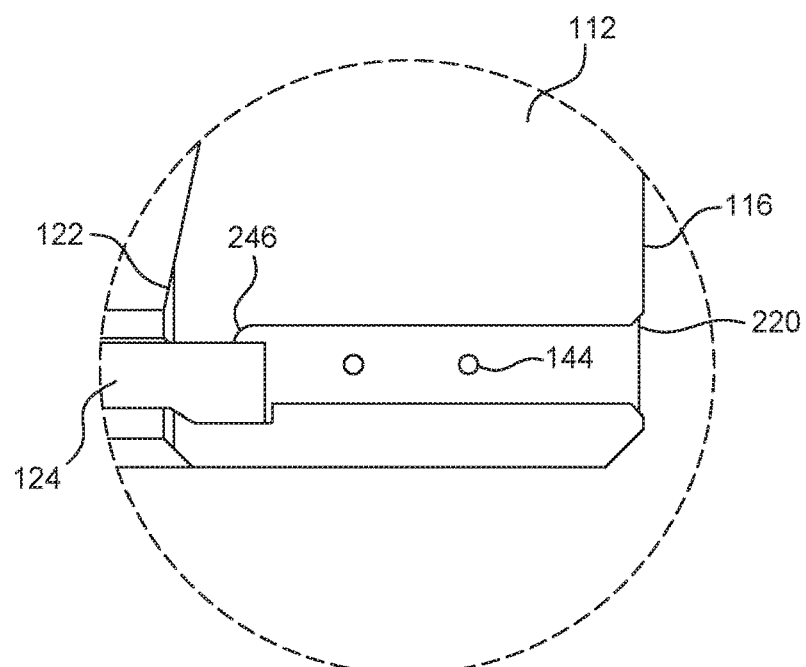
FIGS. 7A and 7B are enlarged views of a portion of a retainer plate and a bushing groove interface of the wear bushing assembly.

FIG. 6 is a front view of the first half 106 of the split bowl 104. FIG. 7A is a detailed view of a portion of the interface 112 at the thru bore 122 of the first half 106 shown in FIG. 6. The first half 106 has the interface 112, the tapered annular inner surface 114, the thru bore 122, and the outer diameter 116. The thru bore 122 is disposed below the tapered annular inner surface 114. The bushing groove 124 is formed in the inner diameter 118 of the thru bore 122. One slot 220 is formed in the outer diameter of the first half 106 on one side and another slot 220 is formed in the outer diameter of the first half 106 on the opposite side through the interface 112. The fastener holes 144 are shown formed in the slots 220. The fastener holes 144 are shown positioned in the center of the slots 220 however they may be arranged in any fashion. The bushing groove 124 at least partially intersects the slots 220. The slot 220 may have a rounded shoulder portion 246 that prevents the retainer plate 238 (shown in FIG. 5B for example) from going all the way through slot 220 into the thru bore 122. The slot 220 is formed in the outer diameter 116 but does not extend all the way through the first half 106 into the thru bore 122.

Figure 7B:
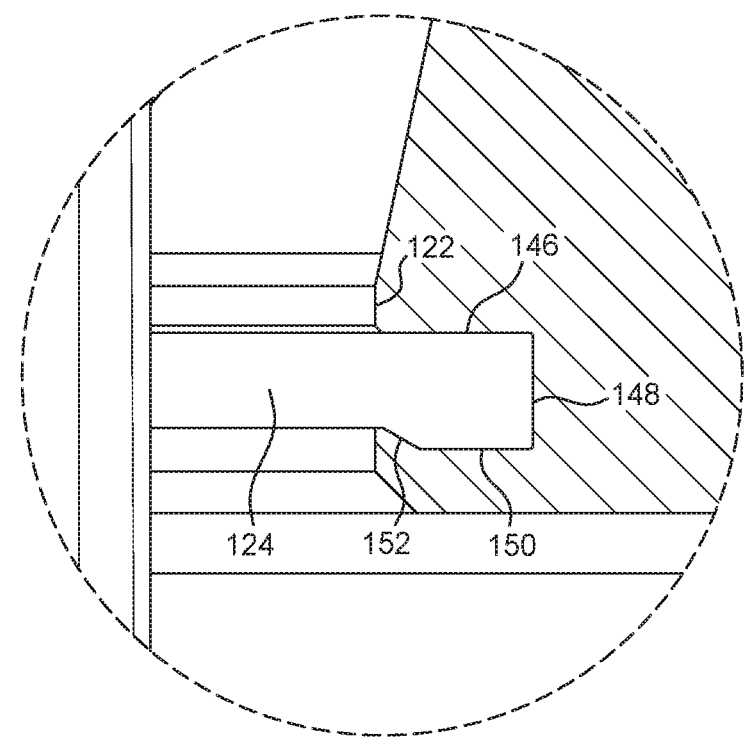

FIG. 7B is a detailed view of a portion of the bushing groove 124 formed in the thru bore 122 of the first half 106. The bushing groove 124 has a top surface 146, a side surface 148, a bottom surface 150, and an angled lip 152 extended from the bottom surface 150. In one embodiment, the angled lip 152 extends from the top surface 146. The top surface 146, the side surface 148, the bottom surface 150, and the angled lip 152 extended from the bottom surface 150 create a partial dove tail design used for securing the wear bushing 326 within the bushing groove 124. The angled lip 152 prevents the wear bushing 326 from falling or being pulled out of the bushing groove 124 axially or radially into the thru bore 122. Although depicted with top, side, and bottom surfaces, and an angled lip extended from the bottom surface in FIG. 7B, the bushing groove 124 may be formed in a variety of shapes, such as a T-shape. In one embodiment, which may be combined with other embodiments, the bushing groove 124 has one or more inner surfaces (such as the top surface 146, the side surface 148, and/or the bottom surface 150) and at least one angled surface (such as the angled lip 152) that extends from at least one of the one or more inner surfaces and is configured to at least partially secure the wear bushing 326 in the bushing groove 124 and prevent the wear bushing 326 from falling or being pulled out of the bushing groove 124 axially or radially into the thru bore 122.

Figure 8:
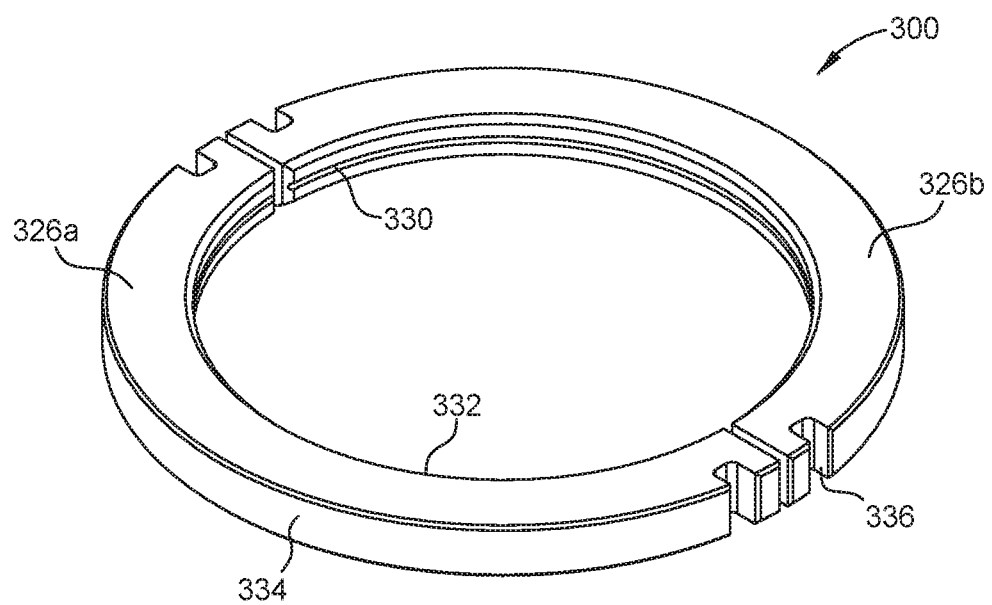
FIG. 8 is an isometric view of the wear bushing assembly.

FIG. 8 depicts the wear bushing assembly 300. The wear bushing assembly 300 consists of wear bushings 326*a* and 326*b*. When assembled, the wear bushing 326*a* may be disposed within the bushing groove 124 of the first half 106 and wear bushing 326*b* may be disposed within the bushing groove 124 of the second half 108. The wear bushings 326*a* and 326*b* have at least one slot 336 formed in the outer diameter 334. As shown in FIG. 8, one slot 336 may be formed in each end of the wear bushings 326*a* and 326*b*. The wear bushings 326*a* and 326*b* may be rotationally fixed within the bushing groove 124 by the retainer plates 238 that are at least partially disposed within the slots 336. The wear groove 330 is formed into the inner diameter 332 of the wear bushings 326*a* and 326*b*. The wear groove 330 is used to provide an indication of wear to the thru bore 122 of the split bowl 104 during drilling operations.

Figure 9:
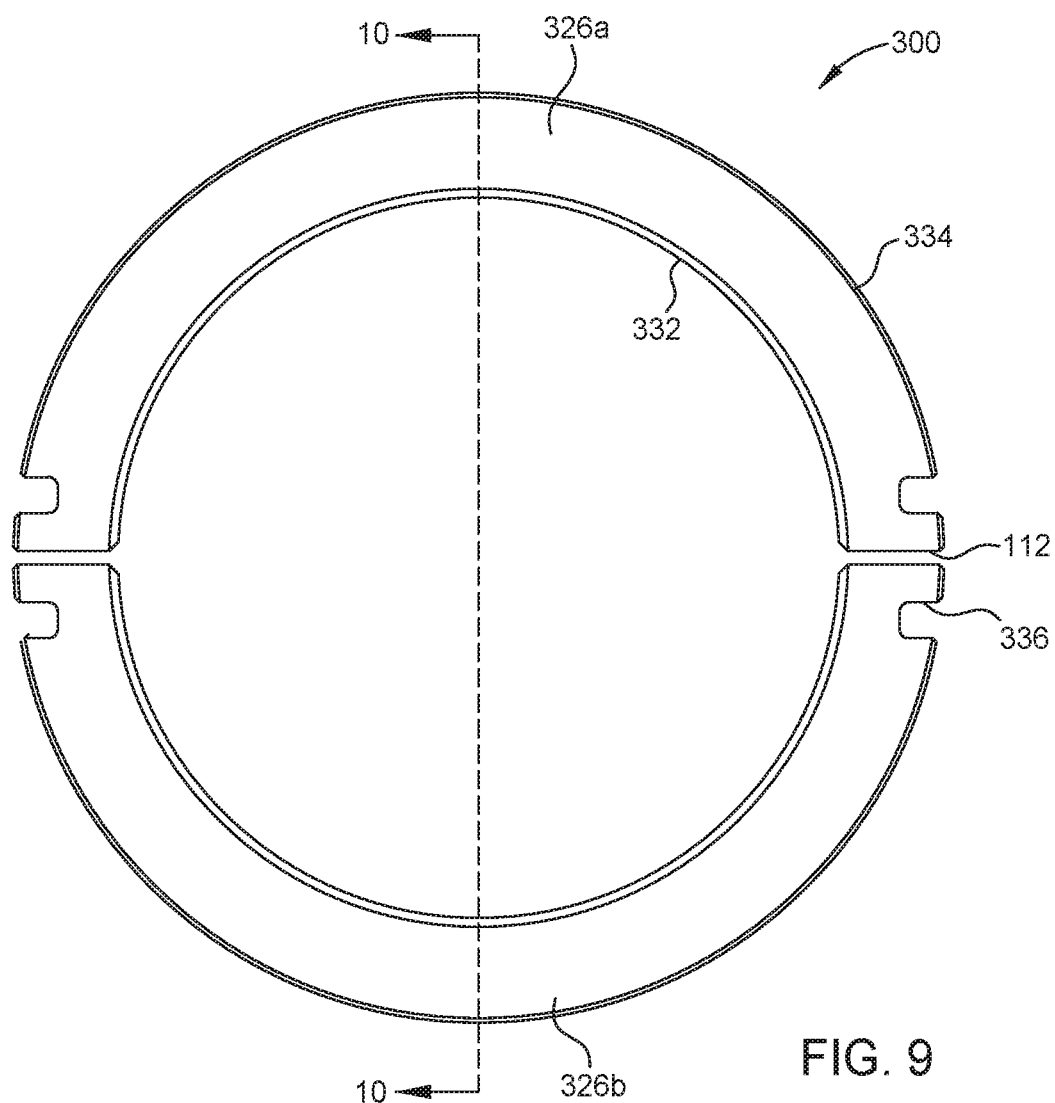
FIG. 9 is a top view of the wear bushing.

FIG. 9 is a top view of the wear bushing assembly 300. The wear bushing assembly 300 comprises the wear bushings 326*a* and 326*b*. Although the wear bushing assembly 300 is shown as having two halves, the wear bushing assembly 300 may be formed by any number of pieces that form a full or at least partial circular shape when assembled. When assembled, the wear bushing 326*a* may be disposed within a bushing groove 124 of the first half 106 and wear bushing 326*b* may be disposed within a bushing groove 124 of the second half 108.

Figure 10:
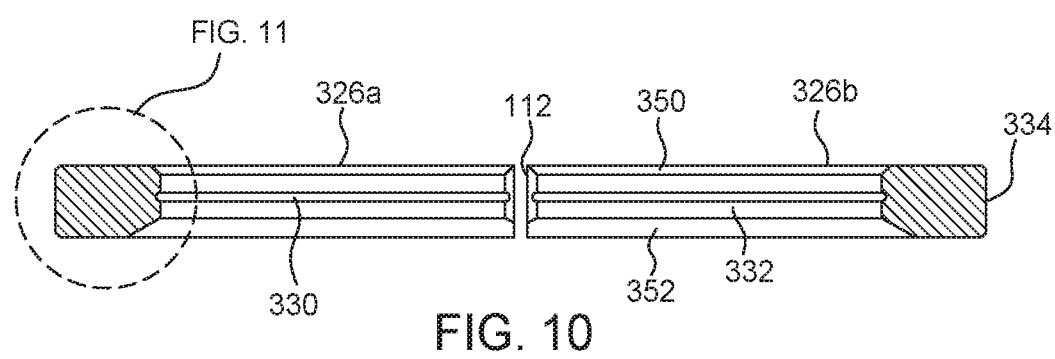
FIG. 10 is a cross sectional view of the wear bushing.
Figure 11:
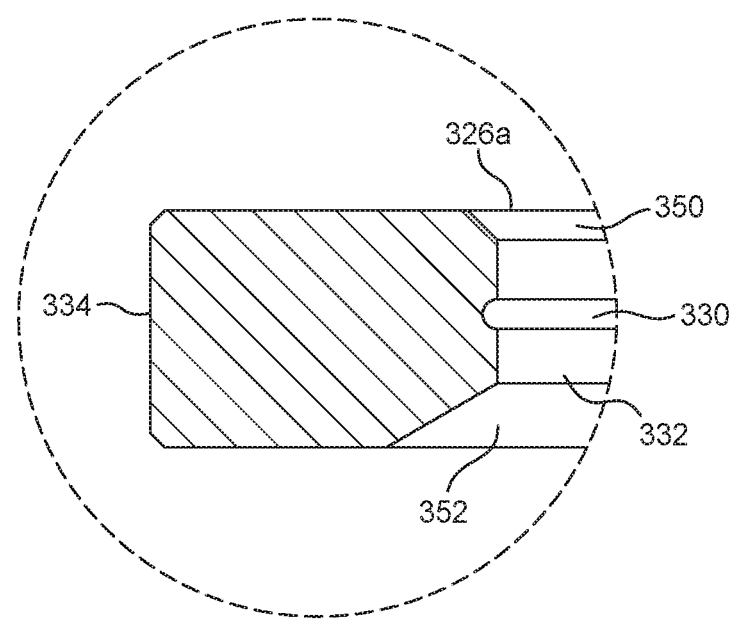
FIG. 11 is an enlarged cross-sectional view of a portion of the wear bushing.

FIG. 10 is a cross sectional view of the wear bushing assembly 300 and FIG. 11 is an enlarged cross sectional view of a portion of the wear bushing 326*a*. The wear bushing 326*a*, 326*b* have tapered edges 350 and 352. The wear groove 330 is shown centered between the tapered edges 350 and 352 of the inner diameter 332 but may be positioned anywhere along the inner diameter 332 of the wear bushings 326*a*, 326*b*. The wear groove 330 has a semi-circular shape as depicted in FIGS. 10 and 11 but may be any other shape, such as a square shape, a rectangular shape, or a V-shape. Although only one wear groove 330 is depicted in FIGS. 10 and 11, two or more wear grooves may be formed in the wear bushings 326*a*, 326*b*.

In one embodiment, which may be combined with other embodiments, the wear bushing 326 does not have a wear groove 330 formed in the wear bushing 326. In this embodiment, the thickness or assembled diameter of the wear bushing 326 may be measured to determine the wear of the wear bushing 326.

Figure 12:
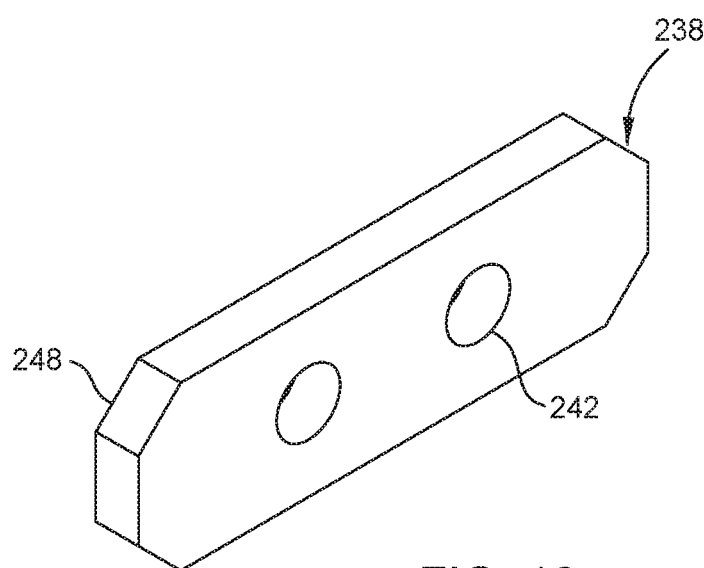
FIG. 12 is an isometric view of the retainer plate.

FIG. 12 is an isometric view of one retainer plate 238. The retainer plate 238 may be used to rotationally fix the wear bushing 326 within the bushing groove 124. As shown FIG. 12, two fastener holes are disposed through the retainer plate 238. While two fastener holes 242 are depicted in FIG. 12, any number of fastener holes 242 may be used. The retainer plate 238 has a rectangular shape as depicted in FIG. 12 but may be any other shape. When the retainer plate 238 is inserted into slot 220 the upper tapered edge 248 of the retainer plate 238 may contact the upper shoulder 246 of slot 220.

It will be appreciated by those skilled in the art that the preceding embodiments are exemplary and not limiting. It is intended that all modifications, permutations, enhancements, equivalents, and improvements thereto that are apparent to those skilled in the art upon a reading of the specification and a study of the drawings are included within the scope of the disclosure. It is therefore intended that the following appended claims may include all such modifications, permutations, enhancements, equivalents, and improvements. The present disclosure also contemplates that one or more aspects of the embodiments described herein may be substituted in for one or more of the other aspects described. The scope of the disclosure is determined by the claims that follow.

What is claimed is:
1. A split bowl assembly, comprising:
   a split bowl comprising:
      a first half and a second half forming a tapered annular inner surface, a thru bore disposed below the tapered annular inner surface, a bushing groove formed in an inner diameter of the thru bore, and a slot formed in an outer diameter of the split bowl; and
   a wear bushing assembly comprising:
      a wear bushing disposed in the bushing groove and comprising a slot formed in an outer diameter of the wear bushing; and
      a retainer plate at least partially disposed in the slot formed in the outer diameter of the split bowl and at least partially disposed in the slot formed in the outer diameter of the wear bushing.
2. The split bowl assembly of claim 1, wherein the wear bushing has a wear groove formed in an inner diameter of the wear bushing.

3. The split bowl assembly of claim 1, wherein the bushing groove has a top surface, a side surface, a bottom surface, and an angled lip extending from the bottom surface, and wherein the wear bushing is at least partially secured within the bushing groove by the angled lip.

4. The split bowl assembly of claim 1, wherein the bushing groove has one or more inner surfaces and at least one angled surface extending from at least one of the one or more inner surfaces, and wherein the wear bushing is at least partially secured within the busing groove by the at least one angled surface.

5. The split bowl assembly of claim 1, wherein the wear bushing is rotationally fixed within the bushing groove by the retainer plate.

6. The split bowl assembly of claim 1, wherein the slot formed in the outer diameter of the split bowl is a T-shaped slot.

7. The split bowl assembly of claim 1, wherein the wear bushing is made of an abrasion resistant material.

8. The split bowl assembly of claim 1, wherein the outer diameter of the wear bushing is disposed adjacent to the inner diameter of the bushing groove.

9. The split bowl assembly of claim 1, wherein the wear bushing has a wear groove formed in an inner diameter of the wear bushing, and wherein a depth ratio of the inner diameter of the wear bushing relative to the wear groove is between about 0.03 and about 0.30.

10. The split bowl assembly of claim 1, wherein the slot formed in the outer diameter of the wear bushing is vertically oriented.

11. The split bowl assembly of claim 1, wherein the retainer plate is coupled to the split bowl by a threaded fastener.

12. A method of installing a wear bushing in a split bowl assembly, comprising:
  positioning a first half and a second half of a split bowl of a split bowl assembly together, wherein a bushing groove is formed in an inner diameter of a thru bore of the first half and the second half and a slot is formed in an outer diameter of the split bowl;
  inserting a wear bushing in the bushing groove, wherein a slot is formed in an outer diameter of the wear bushing;
  inserting a retainer plate into the slot formed in the outer diameter of the split bowl; and
  at least partially inserting the retainer plate in the slot formed in the outer diameter of the wear bushing to inhibit rotation of the wear bushing relative to the split bowl.

13. The method of claim 12, wherein a wear groove is formed in an inner diameter of the wear bushing.

14. The method of claim 12, wherein the bushing groove has at least one top surface, at least one side surface, at least one bottom surface, and at least one angled lip extending from the bottom surface, and wherein the wear bushing is at least partially secured within the bushing groove by the at least one angled lip.

15. The method of claim 12, wherein the wear bushing is rotationally fixed within the bushing groove by the retainer plate.

16. The method of claim 12, wherein the slot formed in the outer diameter of the split bowl is a T-shaped slot.

17. The method of claim 12, wherein the wear bushing is made of an abrasion resistant material.

18. The method of claim 12, wherein the outer diameter of the wear bushing is disposed adjacent to the inner diameter of the bushing groove.

19. The method of claim 12, wherein a wear groove is formed in an inner diameter of the wear bushing, and wherein a depth ratio of the inner diameter of the wear bushing relative to the wear groove is between about 0.03 and about 0.30.

20. The method of claim 12, wherein the slot formed in the outer diameter of the wear bushing is vertically oriented.

21. The method of claim 12, wherein the retainer plate is coupled to the split bowl by a threaded fastener.

* * * * *